(12) United States Patent
Adachi et al.

(10) Patent No.: US 7,881,348 B2
(45) Date of Patent: Feb. 1, 2011

(54) MODE-LOCKED LASER DEVICE

(75) Inventors: Takashi Adachi, Kanagawa-ken (JP); Shogo Yamazoe, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 5 days.

(21) Appl. No.: 12/192,150

(22) Filed: Aug. 15, 2008

(65) Prior Publication Data

US 2008/0317073 A1    Dec. 25, 2008

Related U.S. Application Data

(62) Division of application No. 11/766,834, filed on Jun. 22, 2007.

(30) Foreign Application Priority Data

Jun. 22, 2006  (JP)  ............................ 2006-172167

(51) Int. Cl.
*H01S 3/098*  (2006.01)
(52) U.S. Cl. ............................ 372/18; 372/70; 372/72; 372/75; 372/92; 372/98; 372/99
(58) Field of Classification Search .................... 372/18, 372/70, 72, 75, 92, 98, 99
See application file for complete search history.

(56) References Cited

U.S. PATENT DOCUMENTS 4,864,577 A * 9/1989 Aoshima et al. .............. 372/18

| 6,466,604 | B1 | 10/2002 | Kopf |
| 6,618,423 | B1 | 9/2003 | Dekorsy et al. |
| 6,778,565 | B2 | 8/2004 | Spuehler et al. |
| 2003/0210730 | A1* | 11/2003 | Tomaru et al. .............. 372/101 |
| 2006/0029112 | A1 | 2/2006 | Young et al. |
| 2006/0039436 | A1 | 2/2006 | Lei et al. |

FOREIGN PATENT DOCUMENTS

| EP | 1 630 911 A2 | 3/2006 |
| JP | 11-168252 | 6/1999 |
| WO | 00/45480 A1 | 8/2000 |

OTHER PUBLICATIONS

Spuehler et al., "Passively mode-locked high-power Nd:YAG lasers with multiple laser heads", Appl. Phys. B 71, p. 19-25, Mar. 24, 2000.

(Continued)

*Primary Examiner*—Tod T Van Roy
*Assistant Examiner*—Delma R Forde
(74) *Attorney, Agent, or Firm*—Sughrue Mion, PLLC

(57) ABSTRACT

A mode-locked laser device includes a Fabry-Perot resonator, a mode-locking element disposed within the resonator, a solid-state laser medium disposed within the resonator, and exciting means for applying excitation light to the solid-state laser medium. The opposite ends of the resonator, the mode-locking element and the solid-state laser medium are disposed to provide an average beam diameter of lasing light of not more than 150 μm on the mode-locking element and an average beam diameter of the lasing light of not more than 200 μm within the solid-state laser medium.

6 Claims, 3 Drawing Sheets

OTHER PUBLICATIONS

Spuehler et al., "Diode-pumped passively mode-locked Nd:YAG laser with 10-W average power in a diffraction-limited beam", Optics Lett. 24(8), p. 528-530, Apr. 15, 1999.

Schieffer et al., "Stable dual-passive mode-locking of a 7w thermal-lens-shaped Nd:GdV04 laser", Adv. Sol. Stat. Phot. (ASSP), Vienna, Austria, Feb. 6, 2005, Mode-locked Oscillators, p. 680-685.

Shirakawa et al., "Diode-pumped mode-locked $Yb^{3+}:Y_2O_3$ ceramic laser," Optics Express, Nov. 3, 2003, vol. 11, No. 22, pp. 2911-2916.

Szipöcs et al., "Chirped multilayer coatings for broadband dispersion control in femtosecond lasers," Optics Letters, Feb. 1, 1994, vol. 19, No. 3, pp. 201-203.

* cited by examiner

MODE-LOCKED LASER DEVICE

This is a divisional of application Ser. No. 11/766,834 filed Jun. 22, 2007. The entire disclosure of the prior application, application Ser. No. 11/766,834, is hereby incorporated by reference.

BACKGROUND OF THE INVENTION

1. Field of the Invention

The present invention relates to a mode-locked laser device, and particularly to a mode-locked laser device provided with a solid-state laser medium and a mode-locking element within a Fabry-Perot resonator.

2. Description of the Related Art

As a conventional technique for continuously generating optical short pulse train, a mode locking method is used in which a solid-state laser medium placed in a resonator is excited, for example, with a semiconductor laser, and phases of many lasing longitudinal modes are locked. The mode locking method includes, for example, an active method where an optical modulator is disposed in the resonator to apply loss modulation, and a passive method where a saturable absorber whose absorption coefficient changes nonlinearly is disposed in the resonator to achieve passive mode locking. A passive mode-locked laser device using a saturable absorber has been proposed, for example, in "Diode-pumped mode-locked $Yb_3^+:Y_2O_3$ ceramic laser", OPTICS EXPRESS, Vol. 11, No. 22, pp. 2911-2916, Nov. 3, 2003, and International Patent Publication No. WO00/45480.

The mode-locked laser device typically uses a solid-state laser medium doped with a rare earth such as Yb (ytterbium) or Nd (neodymium). For example, a lasing threshold Pth of a laser device using a Yb-doped solid-state laser medium is expressed by formula (1) below, as described in Appl. Opt., Vol. 36, No. 9, pp. 1867-1874 (1997):

$$P_{th} = \frac{\pi h v_p (\omega_L^2 + \omega_p^2)}{4\sigma\tau\eta_a(f_1 + f_2)}(Loss + T + 2N_0 f_2 \sigma), \qquad (1)$$

wherein $\omega_L$ represents the average beam radius (μm) of lasing light in the solid-state laser medium, $\omega_p$ represents the average beam radius (μm) of excitation light in the solid-state laser medium, $v_p$ represents the frequency of excitation light, Loss represents the internal loss of the resonator, T represents the transmittance of the output mirror, σ represents the stimulated emission cross section (m²), τ represents the fluorescence lifetime (ms), $\eta_a$ represents the excitation light absorption efficiency, $N_o$ represents the amount of doped Yb ion, $f_1$ represents the upper laser level local distribution probability, $f_2$ represents the lower laser level local distribution probability, and h represents the Planck's constant.

As can be seen from formula (1), the lasing threshold can be lowered by reducing the beam radius (diameter) of lasing light and the beam radius (diameter) of excitation light within the solid-state laser medium. To reduce the beam radius (diameter) of lasing light within the solid-state laser medium, the resonator is typically designed so that a beam waist of the lasing light is formed within the solid-state laser medium. Further, in the passive mode-locked laser device using the saturable absorber, it is necessary to form another beam waist of the lasing light on the saturable absorber for achieving efficient mode locking. Since it is necessary to form two beam waists of the lasing light within the resonator, mode-locked laser devices disclosed, for example, in the above-mentioned International Patent Publication No. 00/45480 and "Diode-pumped mode-locked $Yb_3^+:Y_2O_3$ ceramic laser", OPTICS EXPRESS, Vol. 11, No. 22, pp. 2911-2916, Nov. 3, 2003, employ three or more concave mirrors. This increases the number of parts forming the device, thereby making the device large and expensive, and poor in stability.

Further, in the lasing light obtained from the solid-state laser medium doped with Yb ion, three-level lasing is performed at the maximum peak in the fluorescence spectrum thereof, and therefore the lasing efficiency is significantly lowered by reabsorption loss due to electrons distributed at the lower laser level absorbing the lasing light. In order to avoid such reabsorption loss, it is necessary to fill the upper laser level with electrons by performing high-density excitation to minimize the reabsorption of the lasing light. In a case where a semiconductor laser is used as an excitation light source, due to a limitation in the power of commercially-available semiconductor lasers, it is necessary to increase laser density by reducing the beam diameter of excitation light within the solid-state laser medium and to increase the lasing efficiency by increasing overlap between the excitation light and the lasing light within the solid-state laser medium, in order to achieve high-density excitation. The reason for increasing the overlap between the excitation light and the lasing light within the solid-state laser medium is that, if the beam diameter of the excitation light is smaller than the beam diameter of the lasing light within the solid-state laser medium, a large reabsorption loss occurs at areas where no excitation light is present and the lasing efficiency decreases. In contrast, if the beam diameter of the excitation light is larger than the beam diameter of the lasing light within the solid-state laser medium, even areas where no lasing light is present, i.e., areas which do not contribute to lasing are excited and the lasing efficiency also decreases, and therefore sufficient high-density excitation may not be achieved.

On the other hand, the width of light with a wavelength of 940 to 980 nm emitted by a current commercially-available high-power semiconductor laser, which can excite the solid-state laser medium doped with Yb ion, is around 100 μm at the smallest. Therefore, in a Fabry-Perot resonator formed by a small number of parts, it is necessary to excite the solid-state laser medium via a resonator mirror. This increases the distance from the condensing lens to the solid-state laser medium, and necessitates a complicated excitation optical system to efficiently condense the light to have a small diameter.

In a case of a four-level system laser medium such as a solid-state laser medium doped with Nd ion, similarly to the above-described case of the solid-state laser medium doped with Yb ion, the lasing threshold can be lowered by reducing the beam diameters of the lasing light and the excitation light within the solid-state laser medium and increasing the overlap between the lasing light and the excitation light. Therefore, such device also has a complicated resonator structure and a complicated excitation optical system.

As described above, conventional mode-locked laser devices have multiple concave mirrors and thus have a complicated structure. They have poor output stability, and are large and expensive due to the large number of parts. In addition, they use a complicated excitation optical system to improve excitation efficiency, and this further increases the size of such devices.

SUMMARY OF THE INVENTION

In view of the above-described circumstances, the present invention is directed to provide a mode-locked laser device that is compact, has a simple structure and high output stability.

A first aspect of the mode-locked laser device of the present invention includes: a Fabry-Perot resonator; a mode-locking element disposed within the resonator; a solid-state laser medium disposed within the resonator; and exciting means for applying excitation light to the solid-state laser medium, wherein opposite ends of the resonator, the mode-locking element and the solid-state laser medium are disposed to provide an average beam diameter of lasing light of not more than 150 μm on the mode-locking element and an average beam diameter of the lasing light of not more than 200 μm within the solid-state laser medium.

It may be more preferable that the average beam diameter of the lasing light on the mode-locking element is not more than 100 μm.

The "beam diameter" is defined by an area where the light intensity is not less than $1/e^2$ of the maximum intensity in the intensity distribution at a cross-section that is perpendicular to a traveling direction of the light. The "beam diameter" is not uniform but varies within the mode-locking element and within the solid-state laser medium (for example, different beam diameters are formed at the entering edge, the central portion, and the emitting edge), and the "average beam diameter" is an average of beam diameters within the mode-locking element or the solid-state laser medium. It should be noted that in a case where the mode-locking element forms one of the ends of the resonator, the beam diameter of not more than 150 μm on the mirror surface of the mode-locking element is sufficient.

In the mode-locked laser device of the invention, the mode-locking element and the solid-state laser medium may be disposed in the vicinity of a beam waist of the lasing light.

A second aspect of the mode-locked laser device of the invention includes: a Fabry-Perot resonator; a mode-locking element disposed within the resonator; a solid-state laser medium disposed within the resonator; and exciting means for applying excitation light to the solid-state laser medium, wherein the solid-state laser medium and the mode-locking element are disposed in the vicinity of a beam waist of lasing light with a distance between the solid-state laser medium and the mode-locking element being less than ½ of the length of the resonator.

In the mode-locked laser device of the invention, output light may have a lasing wavelength corresponding to a wavelength of a peak in fluorescence spectrum of the solid-state laser medium, at which four-level system lasing is performed. It should be noted that the "four-level lasing" includes "quasi-four-level system" that behaves similarly. For example, a wavelength at which four-level lasing is performed, such as lasing at a wavelength of 1050 nm by the Yb:YAG, is included. In the four-level system lasing, rate of decrease in lasing efficiency, which decreases as the beam diameter of the excitation light within the laser medium increases, is smaller than that of the three-level system, and therefore high lasing efficiency can be achieved without reducing the beam diameter of excitation light within the laser medium as small as that required in the three-level system. Therefore, the four-level system lasing is more suitable for the mode-locked laser device of the invention.

The mode-locking element may be formed by a saturable absorber mirror and may form one of the ends of the resonator.

The exciting means may apply the excitation light to the resonator from a direction crossing the optical axis of the resonator. In this case, a dichroic mirror for reflecting the excitation light and transmitting the lasing light may be provided in the resonator, so that the exciting means directs the excitation light to the dichroic mirror and the dichroic mirror reflects the excitation light toward the solid-state laser medium to apply the excitation light to the solid-state laser medium, or the exciting means may direct the excitation light directly to the solid-state laser medium.

Moreover, in the invention, it may be desirable that the resonator mirror, which forms one of the ends of the resonator, is provided with a coating that has a negative group velocity distribution to provide a zero or less group velocity distribution for the entire resonator.

Further, the opposite ends of the resonator may be formed by a concave mirror and the mode-locking element, and the exciting means may apply the excitation light to the resonator from the back side of the concave mirror along a direction substantially parallel to the optical axis of the resonator. In this case, the length of the Fabry-Perot resonator may be in a range from 1 mm to 14 mm.

The exciting means may be formed only by a semiconductor laser for outputting the excitation light and a single lens for condensing the excitation light onto the solid-state laser medium.

DESCRIPTION OF THE PREFERRED EMBODIMENTS

Hereinafter, embodiments of the present invention will be described in detail.

Figure 1:
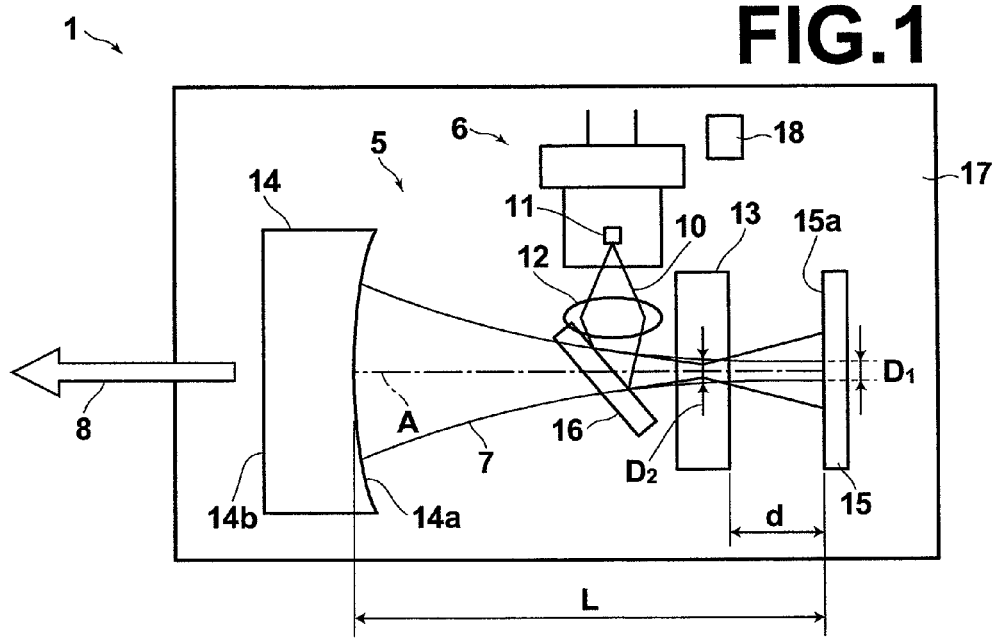
FIG. 1 is a plan view showing the schematic structure of a mode-locked laser device of a first embodiment of the present invention.

FIG. 1 is a plan view showing the schematic structure of a mode-locked laser device 1 according to a first embodiment of the present invention. The mode-locked laser device 1 includes a Fabry-Perot resonator 5, a solid-state laser medium 13 disposed in the resonator 5, a mode-locking element 15, and an exciting means 6 for applying excitation light 10 to the solid-state laser medium 13. The mode-locking element 15 is a saturable absorber mirror, which forms one of the ends of the resonator 5. The other end of the resonator 5 is formed by an output concave mirror 14. The resonator 5 includes no other mirror for reflecting the lasing light than the saturable absorber mirror 15 and the output mirror 14 forming the ends of the resonator, and the resonator 5 is structured as a linear resonator.

The exciting means 6 is formed by a semiconductor laser 11 for outputting a laser beam which serves as the excitation light 10, and a condensing lens 12 for condensing the excitation light 10 onto the solid-state laser medium 13. The semiconductor laser 11 is enclosed in a can package. The exciting means 6 directs the excitation light 10 to the resonator 5 from a direction crossing the optical axis A of the resonator 5. In this embodiment, the exciting means 6 directs the excitation light 10 to the resonator 5 from a direction substantially perpendicular to the optical axis A. A dichroic mirror 16 that reflects the excitation light 10 into the resonator 5 and transmits lasing light 7 is disposed with an inclination of 45° with respect to the optical axis A of the resonator. As the exciting means 6 directs the excitation light 10 to the dichroic mirror 16, the excitation light 10 is reflected by the dichroic mirror 16 and enters the solid-state laser medium 13.

The resonator 5 is structured such that only one beam waist of the lasing light 7 is formed within the resonator 5 (on the mode-locking element in this embodiment). The solid-state laser medium 13 and the saturable absorber mirror 15 are disposed in the vicinity of the beam waist such that a distance d between the solid-state laser medium 13 and the saturable absorber mirror 15 is smaller than ½ of a resonator length L.

The resonator length L and a curvature of a concave surface 14a of the output concave mirror 14 are set in a range where the beam waist of the lasing light is formed on the mirror surface 15a of the saturable absorber mirror 15, and a beam diameter $D_1$ of the lasing light on the mirror surface 15a is not more than 150 µm. The solid-state laser medium 13 is disposed such that an average beam diameter $D_2$ ($=2\omega_L$) of the lasing light within the solid-state laser medium 13 is not more than 200 µm. More specifically, the beam diameter $D_1$ of the lasing light on the mirror surface 15a is in a range from 10 to 150 µm. The lower limit value of 10 µm corresponds to a limit in design, and the upper limit value of 150 µm corresponds to a limitation for obtaining necessary light density for achieving efficient mode locking by the saturable absorber mirror. The average beam diameter $D_2$ of the lasing light within the solid-state laser medium 13 is in a range from 50 to 200 µm. The lower limit value of 50 µm corresponds to a limit in design of the structure in which the resonator is formed by the output concave mirror and the saturable absorber mirror and the beam waist of the lasing light is formed on the mirror surface of the saturable absorber mirror, as in this embodiment. Further, if the average beam diameter $D_2$ of the lasing light exceeds 200 µm, the lasing threshold exceeds 100 mW and this results in lower efficiency.

The upper limit value of 150 µm for the beam diameter $D_1$ of the lasing light on the mirror surface 15a of the saturable absorber mirror 15 has been found from the following consideration. In the following consideration, a semiconductor saturable absorber mirror (SESAM) is used as the saturable absorber mirror 15.

In order to induce mode locking, the pulse energy within the resonator needs to exceed a mode locking threshold $E_{p,c}$ expressed by formula (2) below (see J. Opt. Soc. Am. B, Vol. 16, 46-56 (1999)):

$$E_{p,c} = (F_{sat,L} \times \pi \omega_L^2 \times F_{sat,A} \pi \omega_{sat}^2 \times \Delta R)^{1/2} \qquad (2).$$

The above formula (2) includes five main parameters including the saturation fluence of the solid-state laser medium ($F_{sat,L}$), the saturation fluence of the SESAM ($F_{sat,A}$), the modulation depth of the SESAM ($\Delta R$), the beam diameter of the lasing light within the solid-state laser medium ($\omega_L$), and the beam diameter of the lasing light on the SESAM ($\omega_{sat}$). The mode locking threshold $E_{p,c}$ can be reduced by reducing these parameters. Therefore, stable mode locking can be achieved with relatively small pulse energy within the resonator by reducing these parameters. Among currently known solid-state laser media, one having the smallest saturation fluence ($F_{sat,L}$) is Nd:YVO$_4$ (($F_{sat,L}$)=0.04 J/cm$^2$), which is often used as the mode-locking solid-state laser medium since it provides a small mode locking threshold. Further, among current commercially-available SESAMs, one being usable with Nd:YVO$_4$ (1064 nm) and having the smallest saturation fluence ($F_{sat,A}$) and the smallest modulation depth ($\Delta R$) is a SESAM manufactured by BATOP, having $F_{sat,A}$ of 120 µJ/cm$^2$ and $\Delta R$ of 0.3%. The combination of this SESAM and Nd:YVO$_4$ can provide the currently smallest mode locking threshold.

Figure 4:
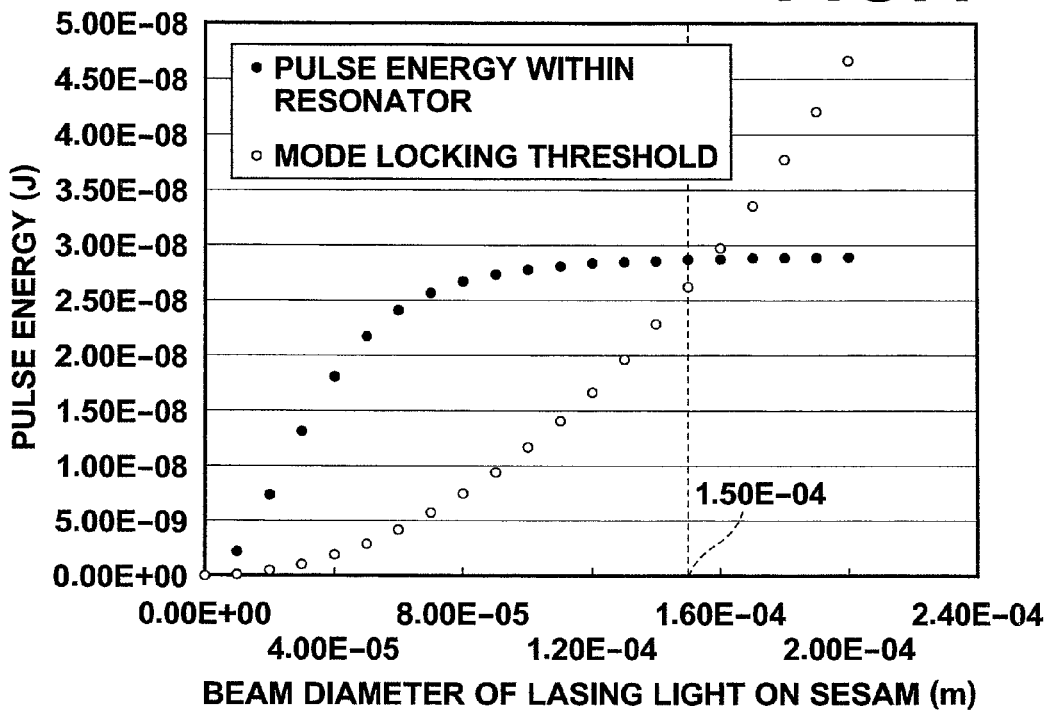
FIG. 4 is a graph showing dependence of a mode locking threshold on a beam diameter of lasing light on a SESAM.

The graph of FIG. 4 shows dependence of the mode locking threshold and the pulse energy within the resonator on the diameter of the lasing beam on the SESAM. Here, Nd:YVO$_4$ is used as the solid-state laser medium and the above-described SESAM manufactured by BATOP is used as the SESAM, and the solid-state laser medium is disposed in the vicinity of the SESAM so that the beam radius of the lasing light within the solid-state laser medium and the beam radius of the lasing light on the SESAM are about the same ($\omega_L = \omega_{sat}$), i.e., the relationship between the beam diameters $D_1$ and $D_2$ in FIG. 1 is $D_1 = D_2$, to find dependence of the mode locking threshold on the beam diameter of the lasing light on the SESAM based on the above formula (2). Further, the pulse energy within the resonator is found based on formula (3) below:

$$E_{p,in} = \frac{P_{out}}{T} \times \frac{L}{c} \qquad (3),$$

$$P_{out} = \eta_{slope} \times (P_{in} - P_{th}),$$

$$\eta_{slope} = \frac{T}{T + \text{Loss}} \times \frac{\lambda_p}{\lambda_L} \times \eta_a \times \frac{\omega_L^2(2\omega_p^2 + \omega_L^2)}{(\omega_p^2 + \omega_L^2)^2},$$

and $$P_{th} = \frac{h\nu_p \pi(\omega_p^2 + \omega_L^2)}{4\eta_a \sigma \tau} \times (L + T),$$

wherein $P_{out}$ represents the average output, T represents the transmittance of the output mirror, L represents the resonator length, c represents the light velocity, $\eta_{slope}$ represents the lasing slope, $P_{in}$ represents the excitation power, $P_{th}$ represents the lasing threshold, Loss represents the internal loss, $\lambda_p$ represents the excitation wavelength, $\eta_a$ represents the excitation light absorption rate, $\omega_p$ represents the average beam radius of the excitation light within the solid-state laser medium, h represents the Planck's constant, σ represents the stimulated emission cross section, and τ represents the fluorescence lifetime. Values for the respective parameters are: T=0.2%, L=0.03 m, Loss=0.6%, $\lambda_p$=808 nm, $\lambda_1$=1064 nm, $\eta_a$=0.99, $\omega_p$=25 µm, σ=25.4×10$^{-19}$ J/cm$^2$, and τ=90 µs. Further, in this calculation, as the excitation light source, a semiconductor laser having maximum power of 2.5 W, lasing wavelength of 808 nm and emitter of 50 µm manufactured by Quintessence Photonics Corporation, which has the highest luminance among current commercially-available semiconductor lasers, is used.

It can be seen from the graph that, when the lasing beam diameter on the SESAM is not more than 150 µm, the pulse energy within the resonator exceeds the mode locking threshold and thus mode locking can be achieved. In other words, in order to achieve mode locking in the above-described resonator structure, it is necessary to have the beam diameter of the lasing light on the SESAM be not more than 150 µm. However, upon modularization (productization) for practical use, it is desirable to design the beam diameter of the lasing light to be not more than 100 µm to provide latitude of about ⅓ with taking tolerance into account.

It should be noted that the average beam diameter $D_2$ of the lasing light within the solid-state laser medium 13 is shown in FIG. 1 as the beam diameter at the center of the solid-state laser medium for convenience, however, the average beam diameter refers to an average of beam diameters of the lasing light that passes through the solid-state laser medium within the solid-state laser medium.

Further, in this embodiment, each of the components 11 to 16 is disposed in a fixed position on the peltiert element 17. However, each of the components 11 to 16 may be fixed on the peltiert element 17 via a metal (copper, for example) holder. A thermistor 18 for sensing temperature is fixed on the peltiert element 17. Based on the output from the thermistor 18, a temperature controlling circuit (not shown) drives the peltiert element 17 to maintain the semiconductor laser 11, the condensing lens 12, the solid-state laser medium 13, the output concave mirror 14, the mode-locking element 15 and the dichroic mirror 16 at a predetermined temperature.

The mode-locked laser device 1 of this embodiment can have a simple structure having the mirrors only at the opposite ends of the resonator. Further, the exciting means can be formed only by a semiconductor laser and a single lens. Therefore, a compact and stable mode-locked laser device can be accomplished.

An example of more specific structure of the mode-locked laser device 1 will now be described. As the solid-state laser medium 13, a Yb:$Y_2O_3$ medium is used, which is produced by doping Yb ion to a ceramic medium $Y_2O_3$ (yttria), which is a substrate. The solid-state laser medium doped with Yb ion acts as a three-level system at a wavelength of the maximum peak of the fluorescence spectrum thereof. However, in the mode-locked laser device 1, light with a wavelength (1075 nm) of a peak at a longer wavelength than the maximum peak wavelength, at which the solid-state laser medium acts as a four-level system, is used as output light 8.

The Yb:$Y_2O_3$ medium 13 is doped with 10 at % of Yb ion and has a thickness of 0.65 mm. The both sides of the Yb:$Y_2O_3$ medium 13 are provided with a coating that well transmits either of the excitation light 10 with a wavelength of 980 nm and the lasing light 7 with a wavelength band of 1075 nm.

As the saturable absorber mirror 15, a semiconductor saturable absorber mirror (hereinafter referred to as SESAM) manufactured by BATOP, having a modulation depth of 0.4% and a saturation fluence of 120 µJ/cm$^2$, is used.

The mirror surface (concave surface) 14a of the output concave mirror 14 has a curvature radius of 30 mm, and is provided with a coating that transmits about 1% of the lasing light 7.

The output concave mirror 14 and the SESAM 15 are disposed such that the resonator length L defined between the mirror surface 14a of the output concave mirror 14 and the mirror surface 15a of the SESAM 15 is 30 mm (in the air). The Yb:$Y_2O_3$ medium 13 is disposed at a distance d of 6 mm from the SESAM 15.

As the semiconductor laser 11, a broad-area semiconductor laser having a wavelength of 980 nm, an emission light width of 100 µm and a power of 2 W is used. As the condensing lens 12, a lens that provides the beam diameter of the excitation light of around 100 µm within the Yb:$Y_2O_3$ medium 13 is used. The condensing lens 12 is disposed in the vicinity of the dichroic mirror 16 so as not to interfere with the optical path of the resonator. The condensing lens 12 condenses the excitation light 10 so that the beam waist of the excitation light is positioned in the vicinity of the center of the Yb:$Y_2O_3$ medium 13 in the thickness direction of the medium.

The dichroic mirror 16 is a 1-mm square quartz plate having a thickness of 0.3 mm and provided with a coating that well reflects the excitation light 10 with the wavelength of 980 nm entering at an incident angle of 45° and well transmits the lasing light 7 with the wavelength band of 1075 nm entering at an incident angle of 45°. The dichroic mirror 16 is disposed in the vicinity of the Yb:$Y_2O_3$ medium 13.

In this structure, the lasing beam diameter $D_1$ on the SESAM 15 is 64 µm, and the average lasing beam diameter $D_2$ within the Yb:$Y_2O_3$ medium 13 is 146 µm.

In the mode-locked laser device 1, the light with the wavelength band of 1075 nm, which is excited by the excitation light 10 and emitted by the Yb:$Y_2O_3$ medium 13, resonates between the output concave mirror 14 and the SESAM 15 and is mode-locked by the SESAM 15, and then is outputted from the output concave mirror 14 as the output light (pulse laser) 8. The mode-locked laser device having the above-described structure provides a recurrence frequency of 5 GHz, a pulse width of 1.5 psec. and an average power of 350 mW, where the average power=pulse energy×recurrence frequency. The average power obtained in this embodiment is 1.5 times efficient than the average power of a conventional device which has the structure similar to the device of the first embodiment and has the laser medium positioned at a distance of 15 mm from the SESAM, which position is near the center of the resonator. In the conventional device, the diameter of the lasing beam within the laser medium is as large as 300 µm or more. Although the same semiconductor laser is used for outputting the excitation light, the conventional device uses complicated excitation optics as the optical system for condensing the excitation light onto the resonator to provide a condensed beam diameter of 100 µm within the laser medium. An average output of the conventional device excited with the same excitation power as that in the above-described embodiment is 220 mW.

Figure 5:
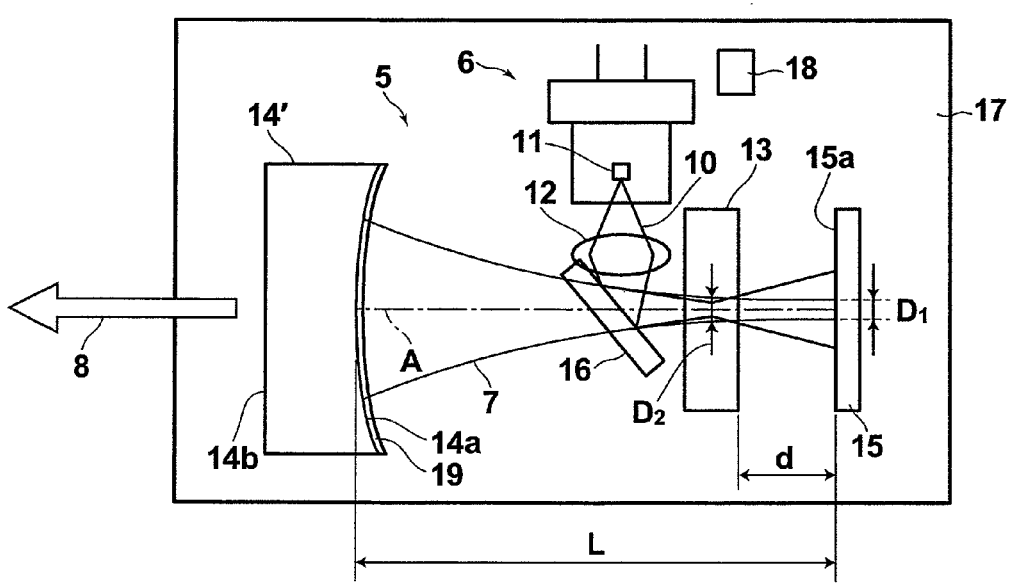
FIG. 5 is a plan view showing a modification of the mode-locked laser device of the first embodiment of the invention.

In a mode-locked laser device 1' shown in FIG. 5, in stead of the output concave mirror 14, an output concave mirror 14' is provided which has a coating 19 that has a negative group velocity distribution to compensate a positive group velocity distribution within the resonator and provide a state where the group velocity distribution for the entire resonator is completely compensated (the group velocity distribution=0) or the group velocity distribution within the resonator is negative (the group velocity distribution<0). This allows induction of soliton mode locking, thereby achieving pulsed light having a pulse width of sub-picosecond order.

For example, in a case where a positive group velocity distribution occurs in the resonator of the device 1' of FIG. 5, the output concave mirror 14' having the coating 19 that has a group velocity distribution of −3000 fs$^2$ is used, and the group velocity distribution for the entire resonator of −2700 fs$^2$ and pulsed laser light having a pulse width of 800 fs can be achieved. It should be noted that, for applying the coating having a negative group velocity distribution, a conventionally-used multilayer film coating technique which is described as a distribution compensating method in Japanese Unexamined Patent Publication No. 11 (1999)-168252, for example, can be used, and a film structure which is similar to a negative distribution mirror described in R. Szipoecs, et. al., Optics Letters, Vol. 19, 201 (1994) can be used.

In general, a Yb-doped solid-state laser medium has a large $F_{sat,L}$, and therefore mode locking is not achieved in a state where the mode locking threshold is high, the resonator length L is as short as 30 mm, and the pulse energy within the resonator is small. However, by compensating the group velocity distribution within the resonator to form a state called soliton mode locking, the mode locking threshold of the Yb-doped solid-state laser medium can be made as low as that of Nd:YVO$_4$, and therefore mode locking can be achieved with the resonator length as short as 30 mm.

It should be noted that the dichroic mirror 16 may be disposed at an angle other than 45° with respect to the optical axis A, and/or may be disposed between the Yb:Y$_2$O$_3$ medium 13 and the SESAM 15. Further, an element for controlling polarization such as a Brewster plate may be provided within the resonator, or the dichroic mirror may be provided with a certain coating and disposed at the Brewster angle to be used as both the dichroic mirror and the Brewster plate. Alternatively, the Yb:Y$_2$O$_3$ medium 13 may be disposed with an inclination corresponding to the Brewster angle with respect to the optical axis A.

Although the lasing light is outputted from the output concave mirror 14 in the above-described embodiment, the lasing light can be outputted from the semiconductor saturable absorber mirror by providing the concave mirror with a coating that well reflects the lasing light and using a transmission-type semiconductor saturable absorber mirror. Besides the SESAM, a saturable absorber mirror using a Kerr mode-locking element or a carbon nanotube can be used as the mode-locking element.

Figure 2:
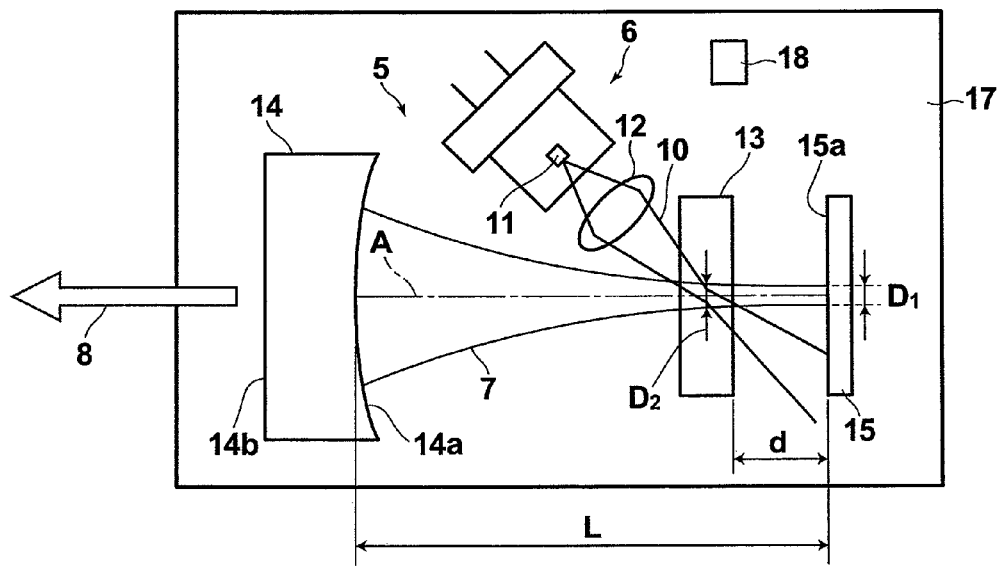
FIG. 2 is a plan view showing the schematic structure of a mode-locked laser device of a second embodiment of the invention.

Next, a mode-locked laser device 2 according to a second embodiment of the present invention will be described with reference to FIG. 2. The basic structure of this embodiment is the same as that of the first embodiment, and therefore the same components are designated by the same reference numerals and are not explained in detail. Explanation will be given mainly on different points.

The mode-locked laser device 2 of this embodiment differs from the mode-locked laser device 1 of the first embodiment in that the position of the exciting means 6 is different and the dichroic mirror 16 is not provided.

The exciting means 6 applies the excitation light 10 to the resonator from a direction crossing the resonator axis A, and the excitation light 10 obliquely enters the solid-state laser medium 13 directly without involving a dichroic mirror. In this case, it is necessary to adjust the incident angle and the condensing position of the excitation light to achieve optimal mode matching within the solid-state laser medium 13.

In the specific structure of the mode-locked laser device 2, components other than the exciting means 6 and their positions can be the same as those in the mode-locked laser device 1 described above. Similarly to the exciting means 6 in the first embodiment, the exciting means 6 in the second embodiment can use the broad-area semiconductor laser 11 having a wavelength of 980 nm, an emission light width of 100 μm and a power of 2 W, and the condensing lens 12 that provides the beam diameter of excitation light of 100 μm within the Yb:Y$_2$O$_3$ medium 13.

With this structure, a recurrence frequency of 5 GHz, a pulse width of 1.5 psec. and an average power of 300 mW are obtained.

Figure 3:
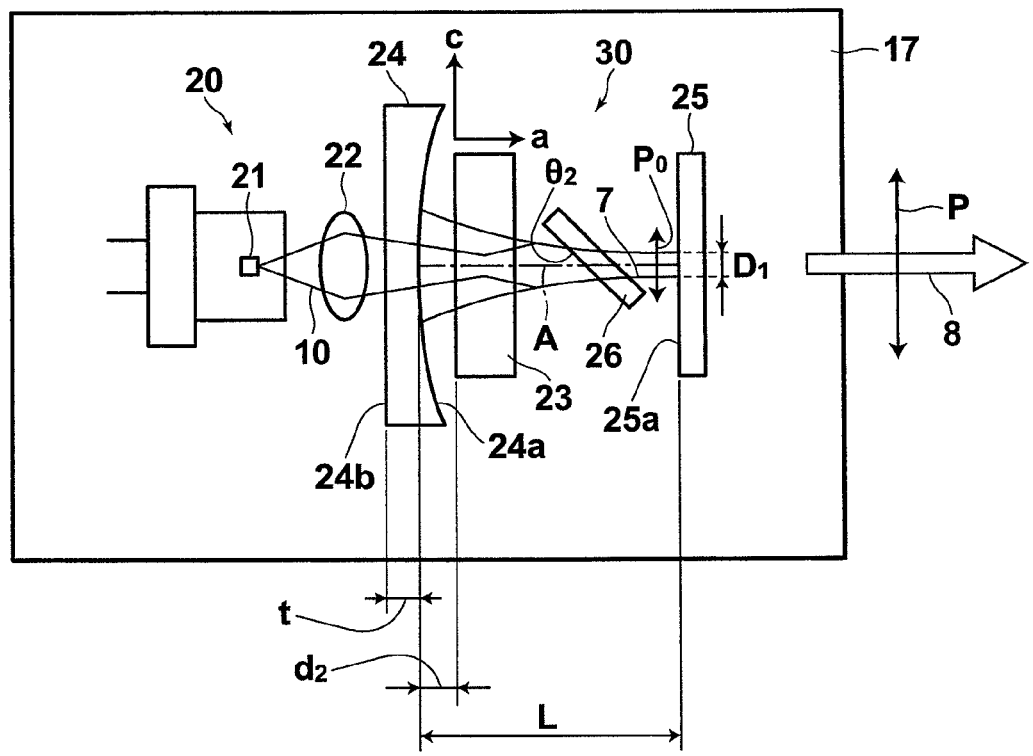
FIG. 3 is a plan view showing the schematic structure of a mode-locked laser device of a third embodiment of the invention.

Next, a mode-locked laser device 3 according to a third embodiment of the present invention will be described with reference to FIG. 3. FIG. 3 is a plan view showing the schematic structure of the mode-locked laser device 3 of the third embodiment of the present invention. The mode-locked laser device 3 includes a Fabry-Perot resonator 30, a solid-state laser medium 23 disposed within the resonator 30, a mode-locking element 25, and an exciting means 20 for applying the excitation light 10 to a solid-state laser medium 23. The mode-locking element 25 is a transmission-type saturable absorber mirror, which forms one of the ends of the resonator 30. The other end of the resonator 30 is formed by a concave mirror 24. The resonator 30 includes no other mirror for reflecting the lasing light than the saturable absorber mirror 25 and the output mirror 24 forming the ends of the resonator, and the resonator 30 is structured as a linear resonator.

The exciting means 20 is formed by a semiconductor laser 21 for outputting a laser beam which serves as the excitation light 10, and a condensing lens 22 for condensing the excitation light 10 onto the solid-state laser medium 23. The semiconductor laser 21 is enclosed in a can package. The exciting means 20 directs the excitation light 10 to the resonator 30 along a direction parallel to the optical axis A of the resonator 30 from the back side 24b of the concave mirror 24.

The resonator 30 is structured such that only one beam waist of the lasing light 7 is formed within the resonator 30 (on the mode-locking element in this embodiment).

The resonator length L and a curvature of a concave surface 24a of the concave mirror 24 are set in a range where the beam waist of the lasing light 7 is formed on the mirror surface 25a of the saturable absorber mirror 25, and the beam diameter $D_1$ of the lasing light on the mirror surface 15a is not more than 100 μm. In particular, the resonator length L is in a range from 1 mm to 14 mm. The solid-state laser medium 13 is disposed such that the average beam diameter $D_2$ of the lasing light within the solid-state laser medium 13 is not more than 200 μm.

Further, a Brewster element 26 for making the polarization direction $P_0$ of the lasing light 7 parallel to the c-axis of the solid-state laser medium 23 is disposed between the solid-state laser medium 23 and the saturable absorber mirror 25 within the resonator.

An example of more specific structure of the mode-locked laser device 3 will now be described. As the solid-state laser medium 23, a Nd:YVO$_4$ medium is used, which is produced by doping Nd ion to a substrate of YVO$_4$.

The Nd:YVO$_4$ medium is doped with 3 at % of Nd ion, has a thickness of 1 mm, and is cut such that the a-axis thereof is parallel to the optical axis. The both sides of the Nd:YVO$_4$ medium are provided with a coating that well transmits either of the excitation light 10 with a wavelength of 809 nm and the lasing light 7 with a wavelength band of 1064 nm.

As the saturable absorber mirror 25, one having a transmittance of 0.3%, a modulation depth of 1.2%, and a saturation fluence of 90 μJ/cm$^2$ is used.

The mirror surface (concave surface) 24a of the concave mirror 24 has a curvature radius of 10 mm and a thickness t of 1 mm. Both of the mirror surface 24a and the planer surface (back side) 24b are provided with a coating that well transmits the excitation light 10, and the mirror surface 24a is further provided with a coating that well reflects the lasing light 7.

The concave mirror 24 and the SESAM 25 are disposed such that the resonator length L defined between the mirror surface 24a of the concave mirror 24 and the mirror surface 25a of the SESAM 25 is 9.1 mm (in the air). The Nd:YVO$_4$ medium 23 is disposed at a distance $d_2$ of 0.3 mm from the concave mirror 25.

The Brewster element 26 is made of quartz having a thickness of 0.4 mm, and is disposed between the Nd:YVO$_4$ medium 23 and the SESAM 25 at an angle of 55.4° with respect to the resonator axis A.

As the semiconductor laser 21, a broad-area semiconductor laser having a wavelength of 809 nm, an emission light width of 100 μm and a power of 2 W is used. As the condensing lens 22, a lens that condenses the excitation light 10 onto the Nd:YVO$_4$ medium 23 to provide a beam diameter of 130 μm with the light being polarized in a direction parallel to the c-axis of the Nd:YVO$_4$ medium 23 is used, and a specific example thereof is SELFOC® lens manufactured by Nippon Sheet Glass Co., Ltd.

In the above-described structure, the lasing beam diameter $D_1$ on the SESAM 25 is 70 μm, and the average lasing beam diameter $D_2$ within the Nd:YVO$_4$ medium 23 is 168 μm.

In this mode-locked laser device 3, the light with the wavelength band of 1064 nm excited by the laser beam 10 and emitted by the Nd:YVO$_4$ medium 23 resonates between the concave mirror 24 and the SESAM 25 and is mode-locked by the SESAM 25, and then is outputted by the transmission-type SESAM 25 as the pulse laser 8. The mode-locked laser device having the above-described structure provides a recurrence frequency of 16 GHz, a pulse width of 7 psec. and an average power of 140 mW.

The respective devices of the above-described embodiments have a simple structure including the mirrors only at the opposite ends thereof, in which only one beam waist of the lasing light is formed within the resonator. Further, the exciting means of each device can be formed only by a semiconductor laser and a single lens. Therefore, the devices can be made compact and stable.

Although Yb:Y$_2$O$_3$ or Nd:YVO$_4$ is used as the solid-state laser medium in the specific examples of the above embodiments, a solid-state laser medium in combination with one of various substrates doped with Nd or Yb ion, such as Nd:GdVO$_4$, Nd:YAG, Nd:glass, Yb:YAG, Yb:KY(WO$_4$)$_2$, Yb:KGd(WO$_4$)$_2$, Yb:Gd$_2$SiO$_5$, Yb:Y$_2$SiO$_5$, can be used. Further, the ion to be doped is not limited to Nd or Yb ion, and any of rare earth ions is applicable.

The mode-locked laser device of the present invention has a Fabry-Perot resonator structure. Therefore, the number of parts forming the mode-locked laser device of the invention is smaller than conventional devices that require a large number of parts. This allows accomplishing a compact, less expensive and highly stable mode-locked laser device. Further, by limiting the beam diameter of the lasing light on the mode-locking element to not more than 150 μm and the beam diameter of the lasing light within the solid-state laser medium to not more than 200 μm, practically sufficient lasing efficiency can be achieved.

Moreover, with the structure having the mode-locking element and the solid-state laser medium disposed in the vicinity of the beam waist, the beam diameter of the lasing light of not more than 150 μm on the mode-locking element and the beam diameter of the lasing light of not more than 200 μm within the solid-state laser medium can easily be accomplished.

The other mode-locked laser device of the present invention has a simple structure including a resonator structured as a linear resonator, wherein the resonator includes mirrors only at the opposite ends thereof, and only one beam waist of the lasing light is formed within the resonator. Therefore, the number of parts forming the mode-locked laser device of the invention is smaller than conventional devices that require a large number of parts. This allows accomplishing a compact, less expensive and highly stable mode-locked laser device. Further, by disposing the solid-state laser medium and the mode-locking element in the vicinity of the beam waist such that the distance between the solid-state laser medium and the mode-locking element is less than ½ of the resonator length, the beam diameters of the lasing light within the solid-state laser medium and on the mode-locking element can be made small enough to achieve practically sufficient lasing efficiency.

By forming the mode-locking element with a saturable absorber mirror that forms one of the ends of the resonator, the number of parts forming the device can further be reduced, thereby making the device more compact.

By providing the resonator mirror, which forms one of the ends of the resonator, with a coating that has a negative group velocity distribution to provide a zero or less group velocity distribution for the entire resonator, soliton mode locking can be induced within the resonator, thereby achieving pulsed light with a shorter pulse width.

By forming the exciting means so as to apply the excitation light to the resonator along a direction substantially parallel to the optical axis of the resonator from the back side of the concave mirror, the overlap between the excitation light and the lasing light can be increased, thereby improving lasing efficiency.

By making the exciting means having a simple structure that includes only a semiconductor laser and a single lens, the size of the mode-locked laser device can further be reduced.

What is claimed is:

1. A mode-locked laser device comprising:
   a Fabry-Perot resonator;
   a mode-locking element disposed within the resonator;
   a solid-state laser medium disposed within the resonator; and
   an exciting means for applying excitation light to the solid-state laser medium,
   wherein opposite ends of the resonator, the mode-locking element and the solid-state laser medium are disposed to provide an average beam diameter of lasing light of not more than 150 μm on the mode-locking element and an average beam diameter of the lasing light of not more than 200 μm within the solid-state laser medium,
   wherein the exciting means applies the excitation light to the resonator from a direction crossing the optical axis of the resonator, wherein the exciting means directs the excitation light directly to the solid-state laser medium; and
   wherein the exciting means is equipped with a focusing lens, the focusing lens focuses the excitation light and causes the excitation light beam to enter the facet of the solid laser medium at an angle.

2. The laser device of claim 1, wherein the solid-state laser medium is a laser crystal.

3. The laser device of claim 1, wherein the excitation light beam enters the facet of the solid-state laser medium at an oblique angle.

4. A mode-locked laser device comprising:
   a Fabry-Perot resonator;
   a mode-locking element disposed within the resonator;
   a solid-state laser medium disposed within the resonator; and
   an exciting means for applying excitation light to the solid-state laser medium,
   wherein opposite ends of the resonator, the mode-locking element and the solid-state laser medium are disposed to provide an average beam diameter of lasing light of not more than 150 μm on the mode-locking element and an average beam-diameter of the lasing light of not more than 200 μm within the solid-state laser medium,
   wherein the solid-state laser medium and the mode-locking element are disposed in the vicinity of a beam waist of lasing light with a distance between the solid-state laser medium and the mode-locking element being less than ½ of the length of the resonator,
   wherein the exciting means applies the excitation light to the resonator from a direction crossing the optical axis of the resonator, wherein the exciting means directs the excitation light directly to the solid-state laser medium; and
   wherein the exciting means is equipped with a focusing lens, the focusing lens focuses the excitation light and causes the excitation light beam to enter the facet of the solid laser medium at an angle.

5. The laser device of claim 4, wherein the solid-state laser medium is a laser crystal.

6. The laser device of claim 4, wherein the excitation light beam enters the facet of the solid-state laser medium at an oblique angle.

* * * * *